US010090991B2

(12) United States Patent
Yoshimura

(10) Patent No.: US 10,090,991 B2
(45) Date of Patent: Oct. 2, 2018

(54) TECHNIQUES FOR COMMUNICATING THROUGH A RELAY STATION BY A PLURALITY OF HALF-DUPLEX WIRELESS DEVICES

(71) Applicant: JVC KENWOOD Corporation, Yokohama-shi, Kanagawa (JP)

(72) Inventor: Motoshi Yoshimura, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 71 days.

(21) Appl. No.: 15/070,251

(22) Filed: Mar. 15, 2016

(65) Prior Publication Data
US 2016/0285613 A1    Sep. 29, 2016

(30) Foreign Application Priority Data

Mar. 23, 2015    (JP) .................................. 2015-059036

(51) Int. Cl.
*H04L 5/16*    (2006.01)
*H04W 84/04*    (2009.01)
(Continued)

(52) U.S. Cl.
CPC ............... *H04L 5/16* (2013.01); *H04W 24/08* (2013.01); *H04W 40/22* (2013.01); *H04W 52/0216* (2013.01); *H04W 64/00* (2013.01); *H04W 72/042* (2013.01); *H04W 84/047* (2013.01); *H04W 84/12* (2013.01)

(58) Field of Classification Search
CPC ........ H04L 5/16; H04W 40/22; H04W 84/47; H04W 24/08; H04W 52/0216; H04W 64/00; H04W 72/042; H04W 84/12
See application file for complete search history.

(56) References Cited

U.S. PATENT DOCUMENTS

| 2004/0198367 | A1* | 10/2004 | Kim ..................... H04W 28/06 455/452.1 |
| 2012/0307673 | A1* | 12/2012 | Chang ................ H04B 7/15592 370/252 |
| 2013/0303227 | A1* | 11/2013 | Liang ..................... H04W 4/08 455/519 |

FOREIGN PATENT DOCUMENTS

| JP | 11-032005 | 2/1999 |
| JP | 2002-064868 | 2/2002 |
| JP | 2013-048323 | 3/2013 |

\* cited by examiner

*Primary Examiner* — Mewale Ambaye
(74) *Attorney, Agent, or Firm* — Amin, Turocy & Watson LLP

(57) ABSTRACT

A wireless communication device according to an embodiment of the present invention performs a half-duplex wireless communication through a relay station that conducts a relay operation of transmitting a received signal in a communication area, and includes a transmitting section, a receiving section, and a determining section. The transmitting section transmits a transmission signal including identification information identifying a wireless communication device. The receiving section receives a relay signal indicating a signal transmitted from a relay station by a relay operation that causes a delay whose length is equivalent to at least one transmission signal. The determining section determines that a wireless communication device itself exists in a communication area in a case where identification information for identifying a wireless communication device itself is included in a relay signal that has been received after transmission of a transmission signal is completed.

5 Claims, 3 Drawing Sheets

(51) Int. Cl.
*H04W 24/08* (2009.01)
*H04W 52/02* (2009.01)
*H04W 64/00* (2009.01)
*H04W 84/12* (2009.01)
*H04W 72/04* (2009.01)
*H04W 40/22* (2009.01)

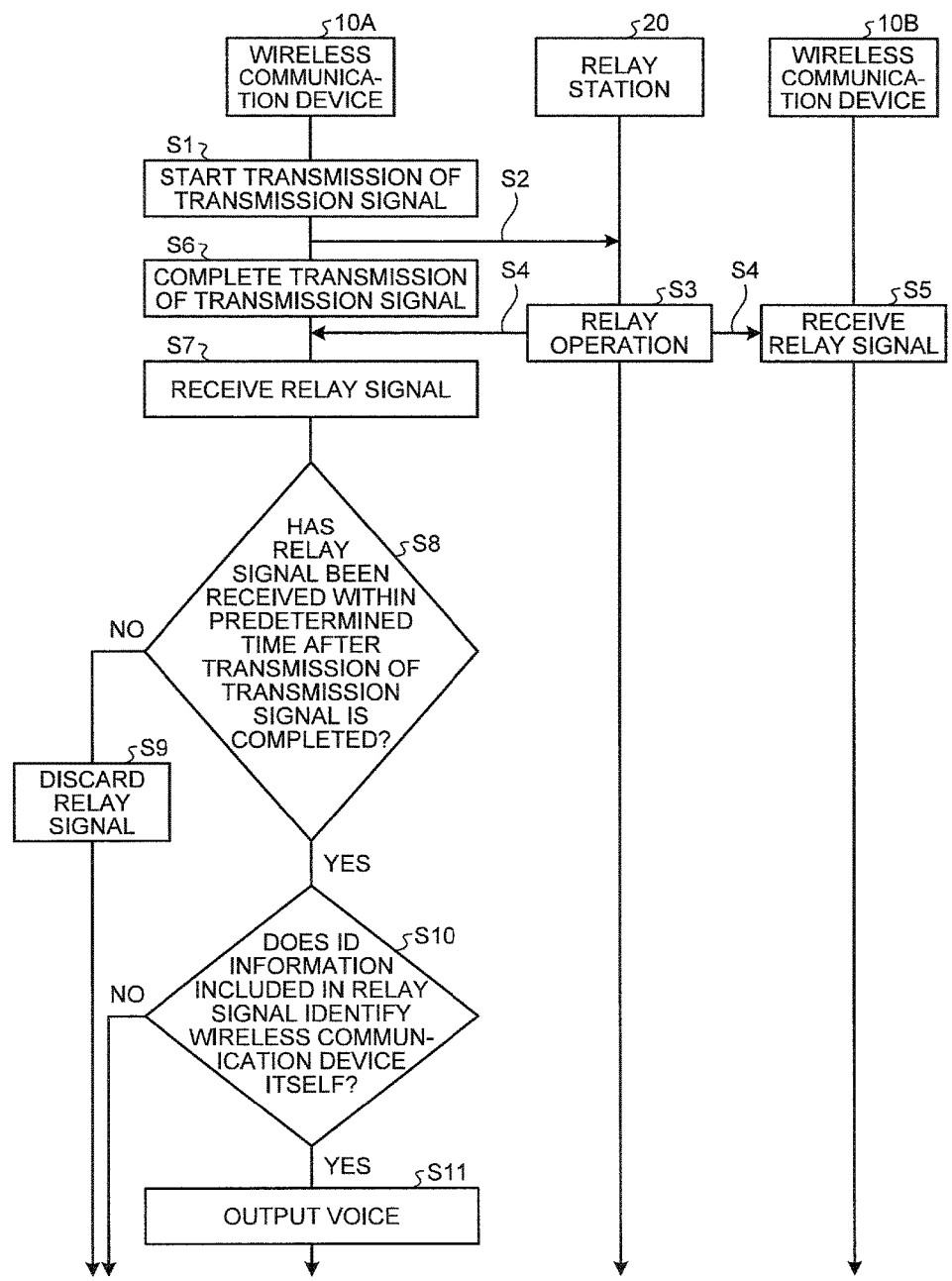

TECHNIQUES FOR COMMUNICATING THROUGH A RELAY STATION BY A PLURALITY OF HALF-DUPLEX WIRELESS DEVICES

CROSS-REFERENCE TO RELATED APPLICATION(S)

The present application claims priority to and incorporates by reference the entire contents of Japanese Patent Application No. 2015-059036 filed in Japan on Mar. 23, 2015.

BACKGROUND OF THE INVENTION

1. Field of the Invention

The present invention relates to a wireless communication device and a wireless communication method.

2. Description of the Related Art

Conventionally, a technique for communicating through a relay station by a plurality of wireless communication devices (mobile stations), each of which performs a half-duplex wireless communication is known. A transmitting frequency on a mobile station side is the same as a receiving frequency at the relay station, and the receiving frequency on the mobile station side is the same as the transmitting frequency on a relay station side. It is difficult for the relay station to simultaneously transmit and receive at the same frequency. Therefore, the transmitting frequency and the receiving frequency at the relay station are separated by a predetermined frequency. All mobile stations transmit at the same frequency and receive at the same frequency, which enables a one-to-one or one-to-many (group communication) communication among mobile stations.

A half-duplex wireless communication device cannot receive a signal relayed from the relay station while transmitting a signal. Therefore, it is not possible to confirm whether or not a transmitted signal has been transmitted in a communication area (whether or not the wireless communication device itself exists in a communication area). For example, Japanese Laid-open Patent Publication No. 11-32005 discloses a technique, by which a mobile station transmits a signal indicating a communication-area confirmation request to a base station, the base station transmits a signal indicating a communication-area confirmation response to the mobile station only when the signal indicating the communication-area confirmation request is normally received from the mobile station, and the mobile station determines that the mobile station (wireless communication device itself) exists in a communication area only when the signal indicating the communication-area confirmation response is normally received from the base station.

However, in the technique disclosed in Japanese Laid-open Patent Publication No. 11-32005, there is a problem that the mobile station is required to transmit a special signal for confirming whether or not the wireless communication device itself exists in the communication area (a signal indicating the communication-area confirmation request) to the base station, and thus communication processing becomes complicated.

SUMMARY OF THE INVENTION

It is an object of the present invention to at least partially solve the problems in the conventional technology. According to an aspect of the invention, a wireless communication device performs a half-duplex wireless communication through a relay station that conducts a relay operation of transmitting a received signal to a communication area, and the wireless communication device comprises: a transmitting section that transmits a transmission signal including identification information identifying the wireless communication device; a receiving section that receives a relay signal indicating a signal transmitted from the relay station by the relay operation that causes a delay whose length is equivalent to at least the one transmission signal; and a determining section that determines that a wireless communication device itself exists in the communication area in a case where the identification information identifying the wireless communication device itself is included in the relay signal received after transmission of the transmission signal is completed.

According to another aspect of the invention, a wireless communication method, by a wireless communication device that performs a half-duplex wireless communication through a relay station that conducts a relay operation of transmitting a received signal in a communication area, comprises: transmitting a transmission signal including identification information identifying the wireless communication device; receiving a relay signal indicating a signal to be transmitted from the relay station by the relay operation that causes a delay whose length is equivalent to at least the one transmission signal after the transmission signal is transmitted; and determining that a wireless communication device itself exists in the communication area in a case where the identification information for identifying a wireless communication device itself is included in the relay signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart illustrating an exemplary processing where a wireless communication device determines whether or not a wireless communication device itself exists in a communication area based on a relay signal received after transmitting a transmission signal.

DETAILED DESCRIPTION OF THE PREFERRED EMBODIMENTS

A wireless communication device and a wireless communication method according to an embodiment of the present invention will be described in detail below with reference to the attached drawings. The present invention is not limited to the embodiment below.

Figure 1:
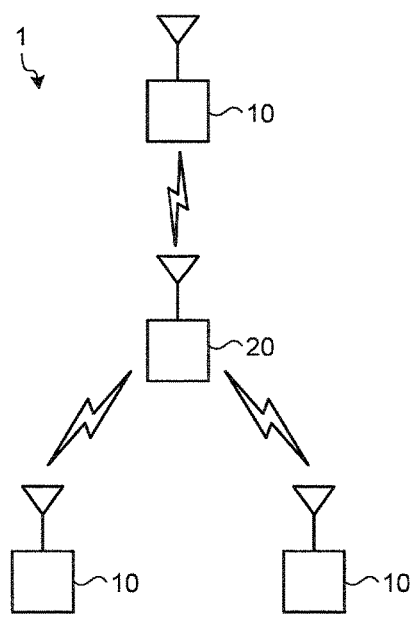
FIG. 1 is a diagram illustrating an exemplary schematic configuration of a wireless communication system according to an embodiment of the present invention.

FIG. 1 is a diagram illustrating an exemplary schematic configuration of a wireless communication system 1 in the present embodiment. As illustrated in FIG. 1, the wireless communication system 1 includes a plurality of wireless communication devices 10 and a relay station 20. The relay station 20 conducts a relay operation of transmitting a received signal (a signal that has been received from any of the wireless communication devices 10) in a communication area (to transmit to reach all wireless communication devices 10 existing in a communication area). The wireless communication devices 10 each perform a half-duplex wireless communication through the relay station 20. A half-duplex wireless communication is a form of wireless communication that is capable of either one of receiving and transmitting.

Here, it is difficult for the relay station 20 to simultaneously transmit and receive at the same frequency. Therefore, a transmitting frequency at the relay station 20 (a receiving frequency on a wireless communication device 10 side) and a receiving frequency thereat (a transmitting frequency on the wireless communication device 10 side) are separated by a predetermined frequency. That is, it is assumed that a transmitting frequency band at the wireless communication devices 10 (a receiving frequency band at the relay station 20) and a receiving frequency band at the wireless communication devices 10 (a transmitting frequency band at the relay station 20) are different.

In the example of FIG. 1, the wireless communication system 1 includes, but is not limited to, three wireless communication devices 10. The number of the wireless communication devices 10 included in the wireless communication system 1 is arbitrary.

Figure 2:
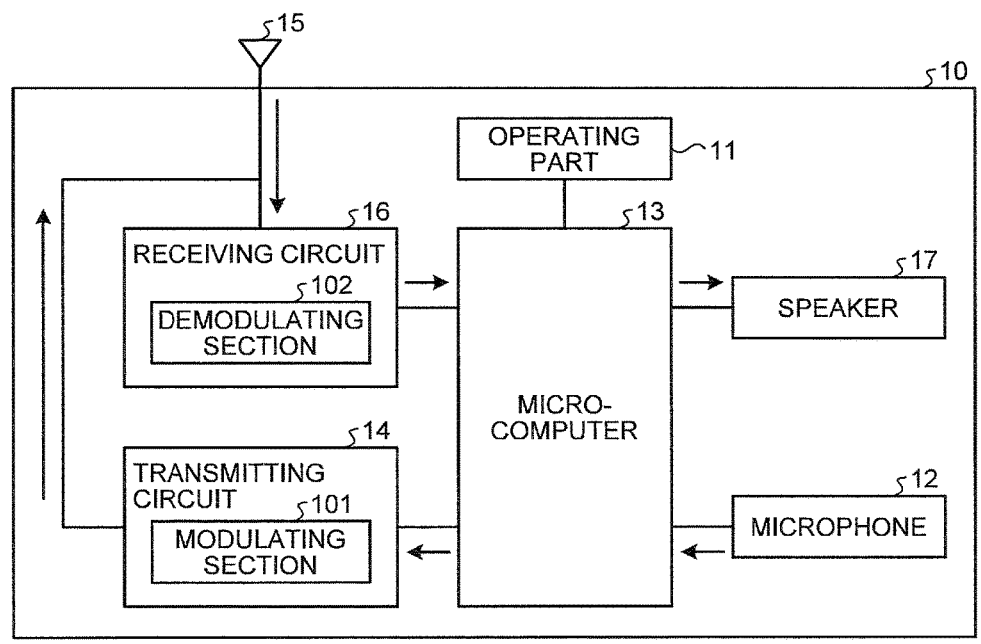
FIG. 2 is a diagram illustrating an exemplary hardware configuration of a wireless communication device.

FIG. 2 is a diagram illustrating an exemplary hardware configuration of a wireless communication device 10. FIG. 2 exemplifies only one wireless communication device 10, but hardware configurations of other wireless communication devices 10 are the same as FIG. 2. As illustrated in FIG. 2, the wireless communication device 10 includes an operating part 11, a microphone 12, a microcomputer 13, a transmitting circuit 14, a transmitting and receiving antenna 15, a receiving circuit 16, and a speaker 17.

The operating part 11 is a device to instruct transmission of a transmission signal from the wireless communication device 10. In this example, the operating part 11 includes a button to receive a pushing-down operation by a user (hereinafter may be referred to as a "transmitting button"). The wireless communication device 10 enters a state transmitting the transmission signal (transmitting state) while the transmitting button (operating part 11) is pushed down, and, while the pushing-down of the transmitting button is released, enters a state receiving a relay signal indicating a signal transmitted from a relay station 20 by a relay operation (receiving state) (equivalent to the transmission signal transmitted by a wireless communication device itself or the transmission signal transmitted by another wireless communication device 10).

The microphone 12 is a device that converts a voice that has been input by the user into an electric signal (an analogue electric signal).

The microcomputer 13 is a computer using a microprocessor as a CPU. In this embodiment, the microcomputer 13 generates the transmission signal including identification information (hereinafter referred to as "ID information") identifying the wireless communication device 10 (wireless communication device itself) while the transmitting button is pushed down. For example, when the user inputs a voice while pushing down the transmitting button, the microcomputer 13 converts the electric signal input from the microphone 12 into digital data and generates the transmission signal including the converted digital data (hereinafter referred to as "voice data") and the ID information. Then, the microcomputer 13 encodes the generated transmission signal and feeds to the transmitting circuit 14.

Figure 3:
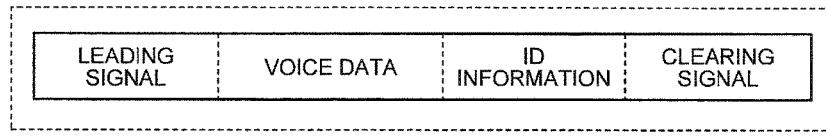
FIG. 3 is a diagram illustrating an exemplary transmission data.

FIG. 3 is a diagram illustrating an exemplary transmission signal. As illustrated in FIG. 3, the transmission signal is represented by a digital signal in a predetermined size (in this example, a size equivalent to one packet) including a leading signal, voice data, ID information, and a clearing signal. A microcomputer 13 starts generating the transmission signal, triggered by pushing-down of a transmitting button by a user, and continuously generates the transmission signal and feeds to a transmitting circuit 14, while the transmitting button is pushed down. The voice data indicating a voice that has been input by the user during a period when the transmitting button is pushed down are allocated to each of a plurality of transmission signals to be generated during the period (a plurality of data dividing all voice data and a plurality of transmission signals are allocated in a form corresponding to one-to-one).

Description of FIG. 2 will be continued. The transmitting circuit 14 includes a modulating section 101 that modulates the transmission signal. As one example of a modulation system, a four-value FSK system is used here. The transmitting and receiving antenna 15 transmits the transmission signal modulated by the modulating section 101. In this example, it is considered that the transmitting and receiving antenna 15 corresponds to a "transmitting section" in claims. The transmitting and receiving antenna 15 also has a function of receiving the relay signal transmitted from the relay station 20 by the relay operation, and is considered to correspond to a "receiving section" in claims.

The receiving circuit 16 includes a demodulating section 102 that demodulates the relay signal received by the transmitting and receiving antenna 15. The microcomputer 13 decodes the relay signal demodulated by the demodulating section 102 and feeds the voice data included in the demodulated relay signal to the speaker 17. The speaker 17 converts the voice data (electric signal) fed from the microcomputer 13 into a voice and output.

Figure 4:
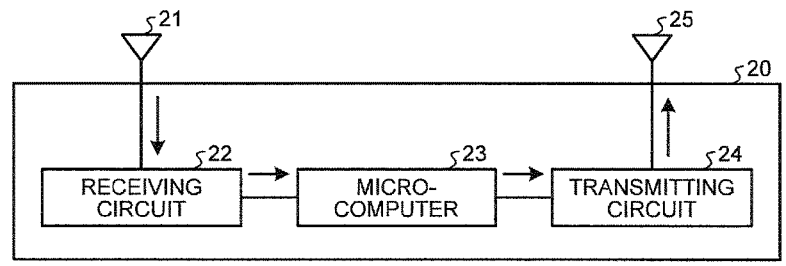
FIG. 4 is a diagram illustrating an exemplary hardware configuration of a relay station.

FIG. 4 is a diagram illustrating an exemplary hardware configuration of a relay station 20. As illustrated in FIG. 4, the relay station 20 includes a receiving antenna 21, a receiving circuit 22, a microcomputer 23, a transmitting circuit 24, and a transmitting antenna 25.

The receiving antenna 21 receives a transmission signal transmitted from wireless communication devices 10. The receiving circuit 22 demodulates the transmission signal received at the receiving antenna 21 and feeds to the microcomputer 23. The microcomputer 23 feeds the transmission signal fed from the receiving circuit 22 to the transmitting circuit 24. The transmitting circuit 24 modulates the transmission signal fed from the microcomputer 23. The transmitting antenna 25 transmits the transmission signal modulated by the transmitting circuit 24 in a communication area as a relay signal. That is, the transmitting antenna 25 transmits the relay signal so as to reach all wireless communication devices 10 in the communication area.

Hereinafter, any one of a plurality of wireless communication devices 10 will be focused on and described. For convenience of description, a focused wireless communication device 10 is called a "wireless communication device 10A". For example, a case is assumed, where the wireless communication device 10A transmits one or more transmission signals (called a "transmission signal group"). The transmission signal group transmitted by the wireless communication device 10A is transmitted to all wireless communication devices 10 in the communication area as a relay signal by a relay operation by the relay station 20. Therefore, the transmission signal group is also transmitted (returned) to the wireless communication device 10A that is a transmitting source.

Here, the relay operation by the relay station 20 in this embodiment causes a delay whose length is equivalent to at least one transmission signal (a delay equivalent to at least one packet). The wireless communication device 10A cannot receive the relay signal while transmitting the transmission signal group. However, after transmission of the transmission signal group is completed, the wireless communication device 10A can receive a part of the transmitted transmission signal group, equivalent to a length of the delay from an end, as a relay signal.

By using this, in a case where ID information identifying a wireless communication device itself is included in the relay signal received after the transmission of the transmission signal is completed, a microcomputer 13 of the wireless communication device 10A determines that the wireless communication device itself exists in the communication area. More specifically, in a case where the ID information identifying the wireless communication device itself is included in the relay signal received within a predetermined time after the transmission of the transmission signal is completed, the microcomputer 13 judges that the wireless communication device itself has completed transmission in the communication area, and determines that the wireless communication device itself exists in the communication area. In this example, it is considered that the microcomputer 13 corresponds to a "determining section" in claims.

In the present embodiment, in a case where the microcomputer 13 determines that the wireless communication device itself exists in the communication area, a predetermined voice or sound (such as a beep sound) is output from a speaker 17. Not only this, but also in a case the microcomputer 13 determines that the wireless communication device itself exists in the communication area, predetermined light may be emitted, or a predetermined vibration may be generated. In sum, the wireless communication device 10A has a configuration including an informing section that informs a determination result by the microcomputer 13.

Figure 5:
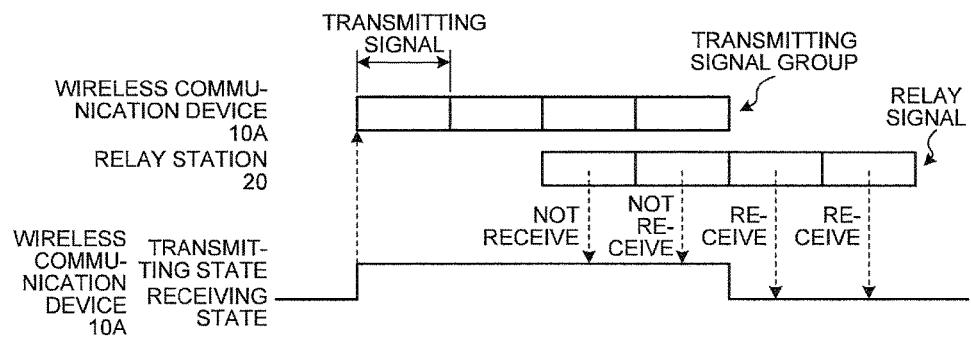
FIG. 5 is a pattern diagram illustrating an exemplary time lag between a transmission signal group transmitted by a wireless communication device and a relay signal received from a relay station.

In the example of FIG. 5, a case is exemplified, where a relay operation by a relay station 20 causes a delay whose length is equivalent to two transmission signals (a delay equivalent to two packets). A wireless communication device 10A receives, after transmission of a transmission signal group of four successive transmission signals is completed, two transmission signals from an end of the transmission signal group as a relay signal. A microcomputer 13 of the wireless communication device 10A confirms the relay signal received after the transmission of the transmission signal group is completed (in this example, two transmission signals from the end of the transmitted transmission signal group) and determines whether or not a wireless communication device itself exists in a communication area.

FIG. 6 is a flowchart illustrating an exemplary processing where a wireless communication device 10A determines whether or not a wireless communication device itself exists in a communication area based on a relay signal received after transmitting a transmission signal (a transmission signal group). For convenience of description, in the example of FIG. 6, as another wireless communication device 10 (a wireless communication device 10 different from the wireless communication device 10A) included in a wireless communication system 1, only one wireless communication device 10 is described and represented as a "wireless communication device 10B".

First, the wireless communication device 10A starts transmitting the transmission signal, triggered by pushing down a transmitting button (operating part 11) by a user (Step S1). The wireless communication device 10A continuously generates and transmits the transmission signal while the transmitting button is pushed down (Step S2). A relay station 20 conducts a relay operation of transmitting the transmission signal received from the wireless communication device 10A in the communication area as a relay signal (Step S3). As a result, the relay signal is transmitted to the wireless communication device 10A and the wireless communication device 10B, respectively (Step S4). In this example, the wireless communication device 10B is in a receiving state, and thus receives the relay signal (Step S5).

On the other hand, the wireless communication device 10A cannot receive the relay signal until transmission of the transmission signal is completed, but completes the transmission of the transmission signal, triggered by a release of the pushing-down of the transmitting button by the user (Step S6). After transmitting a final transmission signal, the wireless communication device 10A shifts to a receiving state and receives the relay signal (Step S7).

Next, the wireless communication device 10A determines whether or not the relay signal has been received within a predetermined time after the transmission of the final transmission signal is completed (Step S8). If a result of Step S8 is negative (Step S8: No), the wireless communication device 10A judges that the relay signal received in Step S7 is not a signal to be determined and discards the relay signal (Step S9). If the result of Step S8 is positive (Step S8: Yes), the wireless communication device 10A determines whether or not ID information included in the relay signal (including at least one or more transmission signals) received in Step S7 is information for identifying the wireless communication device itself (Step S10). If a result of Step S10 is positive (Step S10: Yes), the wireless communication device 10A outputs a predetermined voice or sound (such as a beep sound) from a speaker 17 (Step S11). If the result of Step S10 is negative (Step S10: No), the wireless communication device 10A does not report anything.

As described above, a relay operation by a relay station 20 in the present embodiment causes a delay whose length is equivalent to at least one transmission signal. Therefore, after transmitting a transmission signal group (one or more transmission signals), a wireless communication device 10A can receive a part of the transmitted transmission signal group, equivalent to a length of the delay from an end, as a relay signal. By using this, in a case where ID information identifying a wireless communication device itself is included in the relay signal received after the transmission of the transmission signals is completed, the wireless communication device 10A judges that signals can be normally transmitted to and received from the relay station 20, and determines that the wireless communication device itself exists in a communication area. This can advantageously confirm whether or not the wireless communication device itself exists in the communication area without requiring a special signal.

For example, a user of the wireless communication device 10A may determine whether or not the wireless communication device itself is in the communication area by pushing down a transmitting button for a certain period of time before inputting a voice (before utterance). In this case, triggered by pushing down the transmitting button before voice input, the wireless communication device 10A starts generating the transmission signal including empty voice data. Similarly to the above, the wireless communication device 10A continuously generates the transmission signal (transmission signal including the empty voice data) while the transmitting button is pushed down, and transmits to the relay station 20. The wireless communication device 10A completes the transmission of the transmission signal, triggered by a release of the pushing-down of the transmitting button by the user. After transmitting a final transmission signal, the wireless communication device 10A shifts to the receiving state and receives the relay signal. In a case where the ID information identifying the wireless communication device itself is included in the relay signal received after the transmission of the transmission signal is completed, it is determined that the wireless communication device itself exists in the communication area, and a predetermined voice is output from a speaker 17. As a result, the user can confirm that the wireless communication device 10A exists in the communication area before utterance.

Step S10 may be executed instead of determining, in Step S8 described above, whether or not the relay signal has been received within a predetermined time after the transmission of the final transmission signal is completed. A normal receiving operation may be started in Step S10. In these cases, it is only necessary that the predetermined voice be output from the speaker 17, determining that the wireless communication device itself exists in the communication area only in a case where the ID information of a received signal is the ID information of the wireless communication device itself, and that decoding the received voice data be started in a case where the ID information of the received signal is not the ID information of the wireless communication device itself.

A wireless communication device according to an embodiment of the present invention can confirm whether or not a wireless communication device itself exists in a communication area without requiring a special signal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication device that performs a half-duplex wireless communication through a relay station that conducts a relay operation of transmitting a received signal to a communication area, the wireless communication device comprising:
   a transmitting section that transmits a transmission signal including identification information identifying the wireless communication device;
   a receiving section that receives a relay signal indicating a signal transmitted from the relay station by the relay operation that causes a delay whose length is equivalent to at least the one transmission signal;
   a modulating section that modulates the transmission signal;
   a demodulating section that demodulates the relay signal that has been received by the receiving section; and
   a determining section that determines that the wireless communication device itself exists in the communication area in a case where the identification information for identifying the wireless communication device itself is included in the relay signal received after transmission of the transmission signal is completed, wherein
   the transmitting section transmits the transmission signal that has been modulated by the modulating section,
   the determining section determines that the wireless communication device itself exists in the wireless communication area in a case where the identification information for identifying the wireless communication device itself is included in the relay signal that has been demodulated by the demodulating section, and
   a transmitting frequency band of the wireless communication device is different from a receiving frequency band of the wireless communication device.

2. The wireless communication device according to claim 1, wherein the determining section determines that the wireless communication device itself exists in the communication area in a case where the identification information for identifying a wireless communication device itself is included in the relay signal that has been received within a predetermined time after transmission of the transmission signal is completed.

3. The wireless communication device according to claim 2, wherein the determining section determines that the wireless communication device itself does not exist in the communication area in a case where the identification information for identifying a wireless communication device itself is not included in the relay signal.

4. The wireless communication device according to claim 1, further comprising an informing section that informs a determination result by the determining section.

5. A wireless communication method by a wireless communication device that performs a half-duplex wireless communication through a relay station that conducts a relay operation of transmitting a received signal in a communication area, the method comprising:
   transmitting a transmission signal including identification information identifying the wireless communication device;
   receiving a relay signal indicating a signal to be transmitted from the relay station by the relay operation that causes a delay whose length is equivalent to at least the one transmission signal after the transmission signal is transmitted; and
   determining that the wireless communication device itself exists in the communication area in a case where the identification information for identifying a wireless communication device itself is included in the relay signal that has been received within a predetermined time after transmission of the transmission signal is completed, or
   determining that a wireless communication device itself does not exist in the communication area in a case where the identification information for identifying a wireless communication device itself is not included in the relay signal that has been received within a predetermined time after transmission of the transmission signal is completed.

* * * * *